United States Patent [19]

Doughty et al.

[11] 4,012,561

[45] Mar. 15, 1977

[54] DECORATIVE LAMINATE WITH CARE OF NEWSPRINT AND WOOD PULP

[75] Inventors: Joseph B. Doughty, Sullivan's Island; Carl F. Schulerud, Charleston, both of S.C.

[73] Assignee: Westvaco Corporation, New York, N.Y.

[22] Filed: June 2, 1975

[21] Appl. No.: 583,042

Related U.S. Application Data

[63] Continuation-in-part of Ser. No. 328,260, Jan. 31, 1973, abandoned.

[52] U.S. Cl. .............................. 428/531; 428/529; 428/526; 428/535; 162/147
[51] Int. Cl.² ........................................ B32B 23/06
[58] Field of Search ............... 162/147; 161/6, 259, 161/268, 413, 263; 428/525, 526, 528, 529, 530, 531, 535

[56] References Cited

UNITED STATES PATENTS

| | | | |
|---|---|---|---|
| 2,658,828 | 11/1953 | Pattilloch | 92/21 |
| 3,373,070 | 3/1968 | Fuerst | 428/530 X |
| 3,551,272 | 12/1970 | Ash | 428/530 X |
| 3,644,167 | 2/1972 | Mowry | 428/182 |
| 3,718,536 | 2/1973 | Downs et al. | 156/62.2 X |
| 3,912,569 | 10/1975 | Kapral | 428/530 X |

*Primary Examiner*—P. C. Ives
*Attorney, Agent, or Firm*—Richard L. Schmalz; Ernest B. Lipscomb, III

[57] ABSTRACT

Disclosed herein are decorative laminates meeting N.E.M.A. standards which have high impact resistance, flexural strength, and low water absorption qualities suitable for surface veneering wherein the core stock paper is made from 10% to 100% of newspaper or newsprint pulp which in the preferred practice of the invention is substituted for either the pine portion of the core sheet or the hardwood portion.

3 Claims, No Drawings

DECORATIVE LAMINATE WITH CARE OF NEWSPRINT AND WOOD PULP

CROSS-REFERENCE TO RELATED APPLICATION

This application is a continuation-in-part of copending application Ser. No. 328,260 filed Jan. 31, 1973, and now abandoned.

BACKGROUND OF THE INVENTION

1. Field of the Invention

This invention relates to decorative laminates. More particularly, this invention relates to core stock paper for use in decorative laminates which may be newsprint, newsprint pulp, recycled waste newspaper or repulped newsprint.

2. The Prior Art

Generally, saturating papers have been manufactured from hardwoods and pine, or a combination of the two in various proportions by the kraft pulping process. Hardwoods have customarily been considered cheaper sources of wood for the papermaking process and are desirable for saturating paper because of their excellent absorption qualities. A hundred percent hardwood pulp, although excellent from a saturating viewpoint, is not desirable on the papermaking machine; because the slurry is difficult to maintain at high speeds. Furthermore, a sheet made from all hardwood pulp will tend to pull apart when saturating. Another objection to hardwood pulp is "picking". Picking is the term used for the mechanism of a particle of wood fiber stuck on the roller causing a continuous imprinting of an image on all the paper that passes this point of the roller.

Picking and slow machine speeds are a result of the shortness of the hardwood fibers. A solution to these problems is to add longer stable pulp, such as pine, to the pulp slurry. The longer stable gives the webbing strength and reduces picking greatly, thereby enabling faster running of the paper on a given machine with less defects but is considerably more expensive. Although a solution to problems of runnability and picking is found through the use of pine, others have looked to less expensive core materials to solve the problem but have had to use additional processing steps, such as pretreating with cationic surface active agents as was done in U.S. Pat. No. 2,658,828 to Pattiloch.

It should be kept in mind that the core sheets must meet several stringent requirements. The core sheet must be strong enough to go through the resin solution. The core sheet must be absorbent enough to pick-up and hold resin. The impregnated core sheet must reinforce the laminates and yet have good dimensional stability. And the core sheets must allow bending and not cause excessive warping or deformation. Thus, not every sheet can meet these requirements.

It is, therefore, the general object of this invention to provide a suitable core stock paper containing newspaper.

Another object of this invention is to provide a saturating paper that will be sufficiently flexible so as to be operable in various papermaking machines without worry as to the breaking of the webbing or the picking of the short fibers on the rollers.

Still another object of this invention is to replace a portion of the hardwood or pine furnish of a core sheet with a less expensive material and still meet N.E.M.A. specifications.

Other objects, features and advantages of this invention will be evident from the foregoing detailed description.

SUMMARY OF THE INVENTION

The present invention consists of a substitution of newspaper for the long fiber pine and the hardwood, while still maintaining the National Electrical and Manufacturers Association (N.E.M.A.) specifications for decorative laminates. Use of newspaper core sheet in the manufacture of a saturating paper produces a definite economic advantage and a more workable process, namely higher speeds and less picking. The core sheet may contain from 10% to 100% waste newspaper, and the resulting product still comes well within the N.E.M.A. specifications for laminate items made of the saturating paper.

DETAILED DESCRIPTION OF THE INVENTION

The laminates of the present invention are a combination of paper sheets which have been impregnated with resin and consolidated with a decorative overlay under high temperature and pressure. The decorative overlay is also resin impregnated, although not necessarily with the same resin as used in the core stock. The laminates of the preferred invention are of high impact resistance, flexural strength, and low water absorption qualities and include but are not limited to use as surface veneering, i.e., decorative laminates and mechanical items, i.e., industrial laminates.

In one embodiment of the invention, waste newspaper from various sources is repulped into a suitable slurry and run on a paper machine. The newspaper used in this invention can be either recycled waste paper or unprinted newspaper stock. The unprinted newspaper stock can be the ground wood pulp for making the newspaper stock or the finished newsprint.

A preferred practice of this invention involves using paper made from 100% waste newspaper as the core stock in decorative laminates and industrial laminates; but in any event, at least 10% of the waste newspaper must be used before significant economic advantages are obtained. Preferably, the repulped newspaper is substituted from either the pine or hardwood portion leaving the core sheet from 10% to 90% repulped newspaper and the remainder pine or hardwood. Repulping the waste newspaper may be done as follows: (1) waste newspaper is finely shredded and fed into a mixing tank where a slurry of the waste newsprint and water is formed. and (2) the slurry is then fed to a conventional paper machine fourdrinierj wire. The resulting paper possesses excellent water drainage and picking properties which make is most attractive to paper manufacturers, The core stock paper thickness can be altered by varying the quantity of slurry placed on the fourdrinier wire. Various laminates require different core paper thicknesses, usually about 11 mils.

Repulping the waste newspaper is necessary only to the extent that the industrial specifications on length, thickness and width of laminate material are such that the size of newspaper sheets fall short of the minimal limitations. An example of repulped newspaper of use in laminate manufacture would be an eight foot wide roll from 3 to 5 feet in diameter.

In an alternative embodiment, the newsprint may be used as core sheets as is, without repulping or forming a new web.

The repulped newsprint pulp may be combined with unused fibers, in particular pine to obtain core sheets having optimal advantages of performance and cost. In any event, at least 10% by weight of the total core sheets should be newsprint.

The core sheets are saturated with from 10% to about 70%, preferably 30% to 50%, by weight of phenolic resin. The newspaper containing core sheets is saturated by any of the well known conventional means, such as dip coating; and the saturated sheets are dried. The repulped waste newspaper core stock possesses saturating qualities in excess of its conventional counterpart. Also, the repulped waste newspaper core stock adapts extremely well to a continuous resin saturating operation involving current industrial equipment.

The resin used in the decorative layer usually differs from that used in the core stock. Typical resins for each are: a phenolic resin in the core stock and melamine for the decorative overlay. Melamine-formaldehyde, urea-formaldehyde, epoxy, polyester and other commonly used resins may be used in the core.

Melamine resin is used as the surface component in the saturation of the decorative sheet because of its water white color, abrasion resistance, chemical and stain resistance, heat resistance and color stability. Both phenolic and melamine resins are very excellent resins for laminate use; however, melamine is the better for use in horizontal surface veneering because of its hardness and low color. Therefore, it is the custom of the industry to use the phenolic resin in the core and the melamine resin only on the surface.

A preferred phenolic resin used in this invention was made from phenol, paraformaldehyde and sodium hydroxide at mole ratio of 1:1.845:0.04. A 15-gallon kettle was charged with:

| | |
|---|---|
| Phenol, 92% | 89.70 lbs. |
| Flake paraformaldehyde, 91% | 53.39 lbs. |
| Water | 12.61 lbs. |

This mixture was preheated to 160° F. Then, the sodium hydroxide was added in six equal portions of 212.1 g. 50% NaOH each, for a total 2.81 lbs. 50% NaOH, at 5-minute intervals. The cooking time was measured from the addition of the first portion of catalyst; and thus, the sixth portion was added after 25 minutes. During the first 39 minutes, the kettle temperature was kept at 160° F. Then, the temperature was raised from 160° F. to 180° F. in 2 minutes; and the cook held at this temperature for 25 minutes. After cooling down the kettle, the resin was tested. The properties were:

| | |
|---|---|
| Free $CH_2O$ | 3.3% |
| Viscosity at 25° C. | 150 centipoise |
| Solids (Cenco) | 69.6% |
| pH | 8.6 |

The practice of this invention is clearly illustrated by the following examples.

EXAMPLE 1

In combining the core stock sheets to form the laminate, the number of the core sheets that will be laminated together varies depending on the finished product desired. The core sheet contained 30.4% by weight of the phenolic resin described above. Approximate industrial standard for thickness of laminates used in horizontal surface veneering uses from about 10 to 50 sheets of newspaper core stock to equal about 30–65 mils. The thickness, of course, depends upon the thickness of the core sheets and to an extent the desired properties. In this example, 26 core sheets were laminated with one sheet of melamine resin-impregnated decorative paper and one overlay sheet of alpha cellulose paper of about 3–4 mils thick. This overlay paper is normally 3 to 4 mils thick and is used to provide a thin high resin content protective surface layer with good transparency. The decorative panels were cured in a press at 1,000 p.s.i. using a temperature cycle with a maximum temperature of 290° F. for about one minute and cut into 6 inch × 6 inch panels for testing. The prepared panels were tested as shown in Table I.

TABLE I

6" × 6" Standard Decorative Laminates Made With 100% Repulped Waste Newspaper as the Core Sheets

| | | Waste Newspaper Laminates | N.E.M.A. Specifications |
|---|---|---|---|
| Thickness of Laminate, in. | | 0.061 | 0.062 |
| Water Absorption (2 hr. boiling), % | | 5.1 | 2 – 10 |
| Swelling in Boiling Water, % | | 4.9 | 2 – 10 |
| Flexural Strength, p.s.i. | | | |
| Dec. Side in | ][ M.D. | 21,675 | ≥ 12,000 |
| Tension | ][ C.D. | 16,079 | ≥ 12,000 |
| Dec. Side in | ][ M.D. | 27,856 | ≥ 18,000 |
| Compression | ][ C.D. | 23,015 | ≥ 18,000 |
| Modulus of Elasticity, p.s.i. | | | |
| Dec. Side in | ][ M.D. | $2.04 \times 10^6$ | $\geq 0.8 \times 10^6$ |
| Tension | ][ C.D. | $1.48 \times 10^6$ | $\geq 0.8 \times 10^6$ |
| Dec. Side in | ][ M.D. | $2.00 \times 10^6$ | $\geq 0.8 \times 10^6$ |
| Compression | ][ C.D. | $1.56 \times 10^6$ | $\geq 0.8 \times 10^6$ |
| Deflection at Rupture, in | | | |
| Dec. Side in | ][ M.D. | 0.032 | ≥ 0.02 |
| Tension | ][ C.D. | 0.034 | ≥ 0.02 |
| Dec. Side in | ][ M.D. | 0.041 | ≥ 0.03 |
| Compression | ][ C.D. | 0.035 | ≥ 0.03 |

The results show that the laminates of this invention meet or better N.E.M.A. specifications in each property.

EXAMPLE 2

Not only is it necessary for the decorative laminates to meet N.E.M.A. specifications, but it is also desirable that the properties compare favorable with laminates made from saturating pine kraft paper. Laminates from both newspaper and saturating kraft were made according to the general outline of Example 1, and a comparison of properties of 6 inch × 6 inch test panels is shown in Table II.

TABLE II

6" × 6" Standard Decorative Laminates Made With Waste Newspaper in the Core and a Comparison With Similar Panels With Conventional Saturating Kraft Paper as well as With N.E.M.A.'s Standards

| Core Paper Used | | | Waste Newspaper | Saturating Kraft | N.E.M.A. Specifications |
|---|---|---|---|---|---|
| Water Absorption | | | | | |
| (2 hr. boiling), % | | | 5.1 | 5.7 | 2 – 10 |
| Swelling, % | | | 4.7 | 4.4 | 2 – 10 |
| Flexural Strength, p.s.i. | | | | | |
| Dec. Side in | ][ | M.D. | 21,653 | 27,816 | $\geq 12,000$ |
| Tension | ][ | C.D. | 15,245 | 20,703 | $\geq 12,000$ |
| Dec. Side in | ][ | M.D. | 28,889 | 28,063 | $\geq 18,000$ |
| Compression | ][ | C.D. | 23,507 | 29,028 | $\geq 18,000$ |
| Modulus of Elasticity, p.s.i. | | | | | |
| Dec. Side in | ][ | M.D. | $2.02 \times 10^6$ | $2.29 \times 10^6$ | $\geq 0.8 \times 10^6$ |
| Tension | ][ | C.D. | $1.46 \times 10^6$ | $1.76 \times 10^6$ | $\geq 0.8 \times 10^6$ |
| Dec. Side in | ][ | M.D. | $2.03 \times 10^6$ | $2.46 \times 10^6$ | $\geq 0.8 \times 10^6$ |
| Compression | ][ | C.D. | $1.53 \times 10^6$ | $1.64 \times 10^6$ | $\geq 0.8 \times 10^6$ |
| Deflection at Rupture, in. | | | | | |
| Dec. Side in | ][ | M.D. | .033 | 0.036 | $\geq 0.02$ |
| Tension | ][ | C.D. | .033 | 0.038 | $\geq 0.02$ |
| Dec. Side in | ][ | M.D. | .044 | 0.063 | $\geq 0.03$ |
| Compression | ][ | C.D. | .042 | 0.056 | $\geq 0.03$ |
| Work-To-Break, in.-lbs. | | | | | |
| Dec. Side in | ][ | M.D. | 0.81 | 1.16 | No Standard |
| Tension | ][ | C.D. | .55 | 0.81 | No Standard |
| Dec. Side in | ][ | M.D. | 1.46 | 3.74 | No Standard |
| Compression | ][ | C.D. | 1.25 | 2.05 | No Standard |
| Gross Dimensional | ][ | M.D. | 0.24 | 0.19 | $\leq 0.5$ |
| Change, % | ][ | C.D. | .64 | 0.78 | $\leq 0.9$ |

The newspaper laminates and the saturating kraft laminates have about the same water absorption capacity and swelling index, both these properties being with N.E.M.A.'s 2–10% specification. Although the waste newspaper laminates were somewhat weaker than the saturating kraft laminates, the individual flexural strength met N.E.M.A.'s minimum specifications. The waste newspaper laminates were more flexible than the saturating kraft laminates, that is, they had a lower modulus of elasticity. These results were well above N.E.M.A.'s minimum modulus of elasticity.

In summary, the results clearly show that the waste newspaper laminate had properties comparable to the saturating kraft laminates.

EXAMPLE 3

As an alternative to the use of 100% waste newspaper in the core stock of decorative laminates, the partial replacement of the conventional pulps in saturating kraft with waste newspaper may be made. Saturating kraft paper is principally hardwood with lesser amounts of pine. Therefore, in substituting waste newspaper for the hardwood and pine in saturating kraft paper, two approaches will be discussed; first, replacement of the pine fraction with waste newspaper and, second, replacement of the hardwood fraction with waste newspaper.

Laminates were made replacing the pine fraction with waste newspaper, and 6 inch × 6 inch panels were tested. The results are shown in Table III.

TABLE III

Average Properties of 6" × 6" Standard Decorative Laminates Made With Core Paper in Which the Pine Fraction Was Replaced With Waste Newspaper

| Substituted Newspaper in the Pine Fraction of the Core Paper, % | | | 0 | 52 | 100 |
|---|---|---|---|---|---|
| Water Absorption, % | | | 6.0 | 5.6 | 5.1 |
| Swelling, % | | | 4.9 | 3.6 | 3.6 |
| Flexural Strength, p.s.i. | | | | | |
| Dec. Side in | ][ | M.D. | 21,571 | 21,891 | 21,716 |
| Tension | ][ | C.D. | 15,372 | 16,366 | 16,623 |
| Dec. Side in | ][ | M.D. | 34,272 | 33,882 | 31,981 |
| Compression | ][ | C.D. | 27,586 | 26,956 | 25,656 |
| Modulus of Elasticity, p.s.i. | | | | | |
| Dec. Side in | ][ | M.D. | $1.76 \times 10^6$ | $1.99 \times 10^6$ | $1.84 \times 10^6$ |
| Tension | ][ | C.D. | $1.56 \times 10^6$ | $1.24 \times 10^6$ | $1.35 \times 10^6$ |
| Dec. Side in | ][ | M.D. | $1.84 \times 10^6$ | $1.88 \times 10^6$ | $1.85 \times 10^6$ |
| —Compression | ][ | C.D. | $1.36 \times 10^6$ | $1.36 \times 10^6$ | $1.38 \times 10^6$ |
| Deflection at Rupture, in. | | | | | |
| Dec. Side in | ][ | M.D. | 0.039 | 0.035 | 0.038 |
| Tension | ][ | C.D. | 0.036 | 0.039 | 0.037 |
| Dec. Side in | ][ | M.D. | 0.065 | 0.064 | 0.057 |
| Compression | ][ | C.D. | 0.070 | 0.068 | 0.061 |
| Work-To-Break, in.-lbs. | | | | | |
| Dec. Side in | ][ | M.D. | 1.20 | 1.07 | 1.15 |
| Tension | ][ | C.D. | 0.89 | 0.94 | 0.84 |
| Dec. Side in | ][ | M.D. | 3.22 | 3.20 | 2.57 |
| Compression | ][ | C.D. | 2.76 | 2.64 | 2.16 |
| Gross Dimensional | ][ | M.D. | 0.47 | 0.44 | 0.42 |

TABLE III-continued

Average Properties of 6" × 6" Standard Decorative Laminates Made With Core Paper in Which the Pine Fraction Was Replaced With Waste Newspaper

| Substituted Newspaper in the Pine Fraction of the Core Paper, % | | | 0 | 52 | 100 |
|---|---|---|---|---|---|
| Change, % | ][ | C.D. | 0.90 | 0.89 | 0.75 |

The water absorption of the final laminates decreased, (improved) very slightly with the increasing amounts of waste newspaper. In the same way, the swelling also decreased (improved) slightly. All these results were within N.E.M.A.'s 2–10% specified range.

As the amount of waste newspaper was increased in the saturating kraft paper, the flexural strength of the laminates decreased when tested with the decorative side in compression. These results were well above N.E.M.A.'s minimim specification. The modulus of elasticity and the deflection at rupture of the laminates remained about the same or changed inconsistently with the waste newspaper present. However, all the laminates met or exceeded N.E.M.A.'s specifications.

As the amount of waste newspaper increased in the paper, less work was required to break the panels. The dimensional stability of the laminates improved very slightly with increasing amounts of waste newspaper in the core. The gross dimensional change decreased from 0.47% to minimum 0.42% in the M.D. and from 0.90% to minimum 0.75% in the C.D. All these laminates met N.E.M.A.'s maximum specification for the gross dimensional change of 0.5% in the M.D. and 0.9% in the C.D.

EXAMPLE 4

The results of replacement in the hardwood fraction in the paper with waste newspaper at phenolic resin content of 30% are shown in Table IV.

tion remained almost constant or decreased (improved) slightly. The swelling also remained almost constant.

As the amount of waste newspaper was increased in the saturating kraft paper, the flexural strength of the laminates remained about the same. It was also found in this case that the addition of waste newspaper to the saturating kraft paper lowered the work-to-break of the laminates. The dimensional stability of the laminates remained above constant or improved slightly with increasing amounts of waste newspaper in the core. The gross dimensional change changed from 0.47% to 0.36–0.51% in the M.D. and from 0.90% to 0.77–0.85% in the C.D.

In conclusion, small amounts of waste newspaper, e.g., say 10%, replacing pine or the regular hardwood furnish eliminated picking and facilitated water drainage and, of course, reduce the cost per ton proportionately. A partial or total replacement of the pine fraction or the hardwood fraction in saturating kraft paper with waste newspaper did not have any adverse effect on the properties of standard decorative laminates. The water absorption and swelling remained the same or improved very slightly. The flexural strength in general remained unchanged. The dimensional stability was about the same or slightly better. All the laminates met N.E.M.A.'s specifications for water absorption, swelling, flexural strength, dimension stability, modulus of elasticity and deflection at rupture.

TABLE IV

AVERAGE PROPERTIES OF 6" × 6" Standard Decorative Laminates Made With Core Paper in Which the Hardwood Fraction Was Replaced With Waste Newspaper

| Substituted Newspaper in the Hardwood Fraction of the Core Paper, % | | | 0 | 13 | 33 | 100 |
|---|---|---|---|---|---|---|
| Water Absorption, % | | | 6.0 | 5.8 | 4.6 | 5.9 |
| Swelling, % | | | 4.9 | 4.0 | 4.5 | 4.6 |
| Flexural Strength, p.s.i. | | | | | | |
| Dec. Side in | ][ | M.D. | 21,571 | 22,133 | 21,533 | 22,566 |
| Tension | ][ | C.D. | 15,372 | 15,782 | 15,805 | 16,921 |
| Dec. Side in | ][ | M.D. | 34,272 | 30,255 | 34,134 | 31,326 |
| Compression | ][ | C.D. | 27,586 | 26,233 | 27,319 | 26,877 |
| Modulus of Elasticity, p.s.i. | | | | | | |
| Dec. Side in | ][ | M.D. | $1.76 \times 10^6$ | $1.71 \times 10^6$ | $1.81 \times 10^6$ | $1.93 \times 10^6$ |
| Tension | ][ | C.D. | $1.56 \times 10^6$ | $1.44 \times 10^6$ | $1.32 \times 10^6$ | $1.49 \times 10^6$ |
| Dec. Side in | ][ | M.D. | $1.84 \times 10^6$ | $1.77 \times 10^6$ | $1.88 \times 10^6$ | $1.97 \times 10^6$ |
| Compression | ][ | C.D. | $1.36 \times 10^6$ | $1.43 \times 10^6$ | $1.37 \times 10^6$ | $1.49 \times 10^6$ |
| Deflection at Rupture, in. | | | | | | |
| Dec. Side in | ][ | M.D. | 0.039 | 0.039 | 0.037 | 0.039 |
| Tension | ][ | C.D. | 0.036 | 0.033 | 0.037 | 0.036 |
| Dec. Side in | ][ | M.D. | 0.065 | 0.054 | 0.062 | 0.053 |
| Compression | ][ | C.D. | 0.070 | 0.057 | 0.064 | 0.058 |
| Work-To-Break, in.-lbs. | | | | | | |
| Dec. Side in | ][ | M.D. | 1.20 | 1.21 | 1.08 | 1.10 |
| Tension | ][ | C.D. | 0.89 | 0.81 | 0.80 | 0.75 |
| Dec. Side in | ][ | M.D. | 3.22 | 2.28 | 2.97 | 2.08 |
| Compression | ][ | C.D. | 2.76 | 2.25 | 2.59 | 2.04 |
| Gross Dimensional | ][ | M.D. | 0.47 | 0.51 | 0.41 | 0.36 |
| Change, % | ][ | C.D. | 0.90 | 0.77 | 0.85 | 0.84 |

When 13%, 33% and 100% of the hardwood fraction was replaced with waste newspaper, the water absorp-

EXAMPLE 5

N.E.M.A. promulgates a specification for post forming which is important to certain areas of laminate use. Post forming is the process of applying an elevated heat and pressure to the previously cured laminate. The effect of the heat and pressure will allow the otherwise rigid sheet to be formed into the more desirable configuration; and then upon removal of the elevated heat and pressure, the sheet becomes rigid again but retains the shape into which it was formed. The paper composition of the post formable laminate is extremely important. For example, satisfactory post forming cannot be done with an all pine sheet. The laminate sheets of the present invention were found to have excellent post forming qualities. The laminates were tested and recorded as meeting the N.E.M.A. specifications for post forming of laminates.

While the invention has been described and illustrated herein by references to various specific materials, procedures and examples, it is understood that the invention is not restricted to the particular materials, combination of materials and procedures selected for that purpose. Numerous variations of such details can be employed, as will be appreciated by those skilled in the art

What is claimed is:

1. A decorative laminate meeting N.E.M.A. standards for surface veneering having the following laminae combined in order of ascending superimposed relationship to form a unitary structure, (a) a core, (b) a decorative cellulose sheet impregnated with a melamine resin, and (c) a cellulose overlay sheet impregnated with a melamine resin, the improvement comprising, forming said core from a multiplicity of core sheets, each of said core sheets comsisting essentially of from 10 to 100% repulped newsprint and the remainder of said sheet being a pulp selected from the group consisting of pine pulp, hardwood pulp and mixtures thereof, and impregnating each of said core sheets with from 10 to 70% by weight of a phenolic resin.

2. The decorative laminate of claim 5 wherein said core sheet is comprised of from 10 to 90% repulped newspaper and the remainder of said sheet is pine.

3. The decorative laminate of claim 5 wherein said core sheet is comprised of from 10 to 90% repulped newspaper and the remainder of said sheet is hardwood.

* * * * *

UNITED STATES PATENT AND TRADEMARK OFFICE
CERTIFICATE OF CORRECTION

PATENT NO. : 4,012,561
DATED : March 15, 1977
INVENTOR(S) : Joseph B. Doughty and Carl F. Schulerud It is certified that error appears in the above-identified patent and that said Letters Patent are hereby corrected as shown below:

On the cover page, in the title of the patent, column 1, line 1, "CARE" should read --CORE--.

Column 2, line 51, "fourdrinierj" should read --fourdrinier--.

Column 8, line 20, "above" should read --about--.

In claim 1, column 10, line 13, "comsisting" should read --consisting--.

In claim 2, column 10, line 20, "claim 5" should read --claim 1--.

In claim 3, column 10, line 23, "claim 5" should read --claim 1--.

Signed and Sealed this fifth Day of July 1977

[SEAL]

Attest:

RUTH C. MASON
*Attesting Officer*

C. MARSHALL DANN
*Commissioner of Patents and Trademarks*